March 8, 1927. 1,620,374
E. J. MALONEY
MOTORIZED HANDSAW
Filed March 28, 1925  3 Sheets-Sheet 2
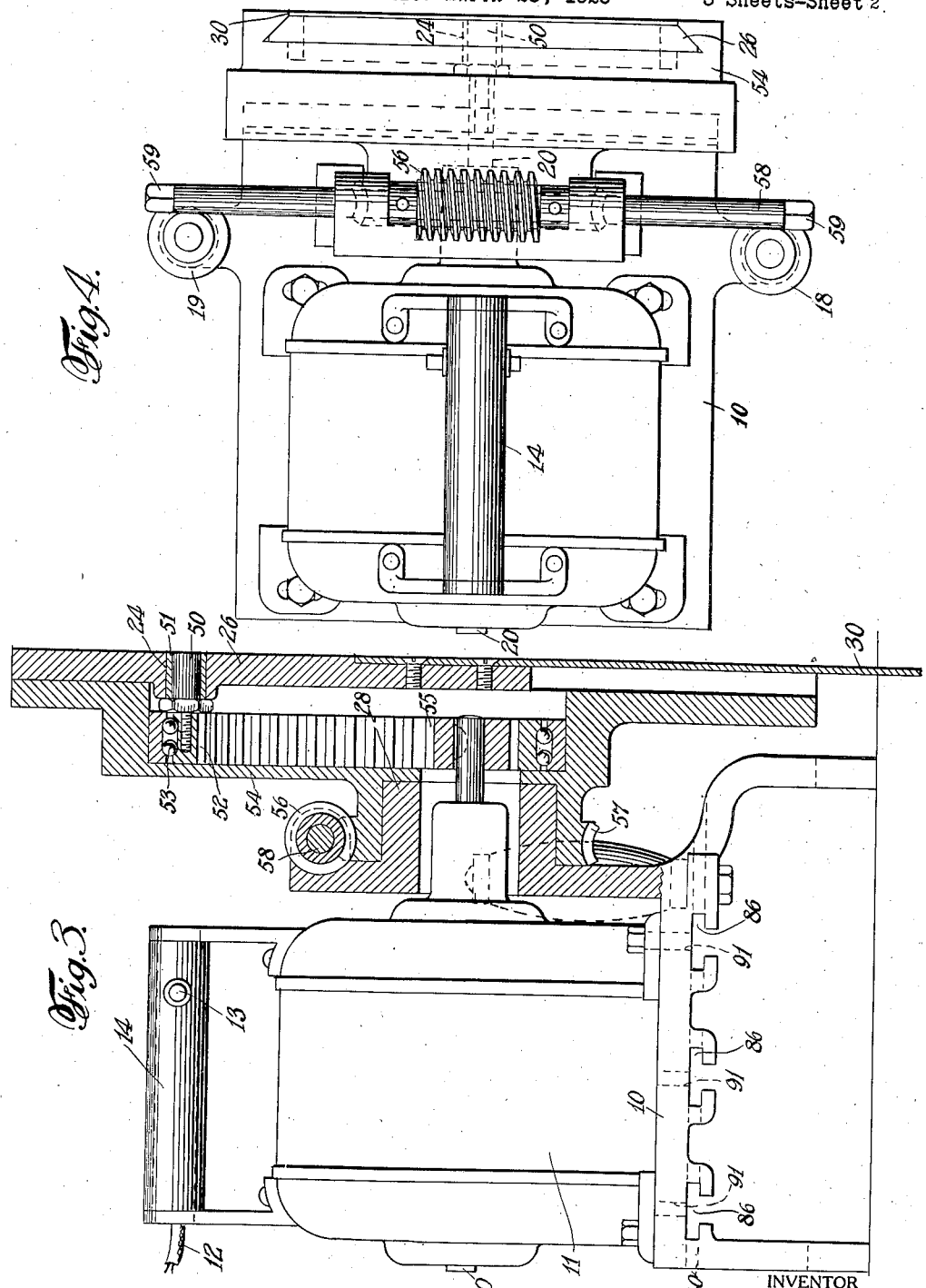

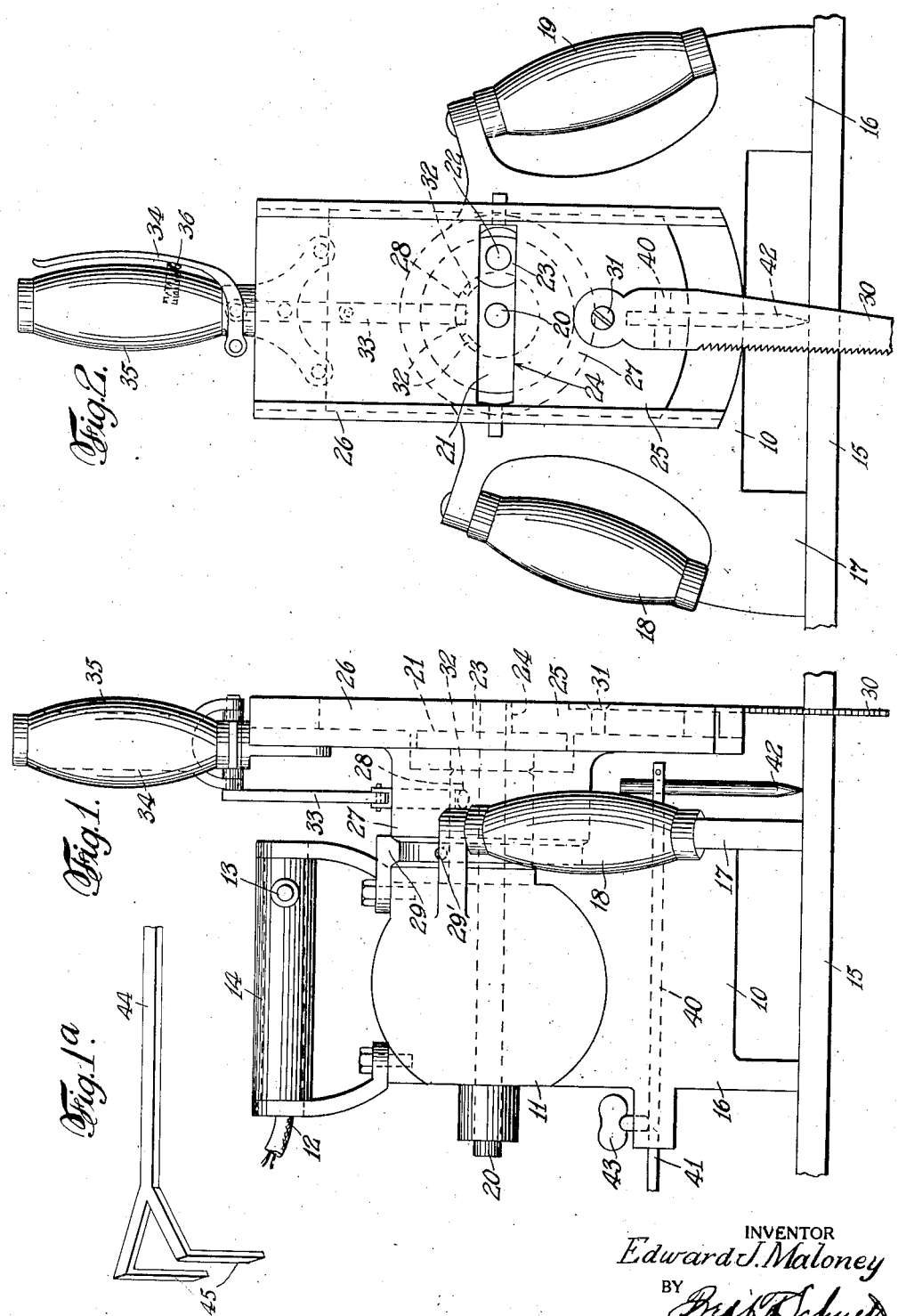

March 8, 1927.
E. J. MALONEY
1,620,374
MOTORIZED HANDSAW
Filed March 28, 1925
3 Sheets-Sheet 3
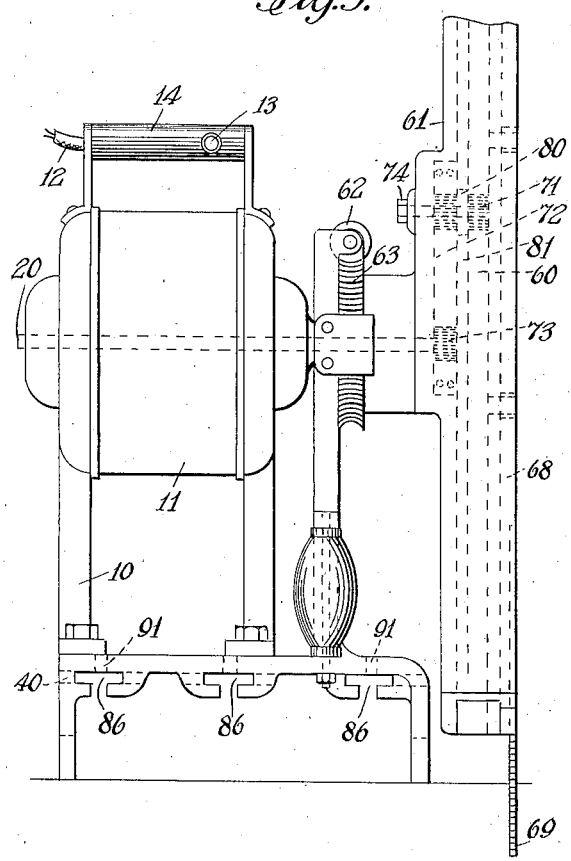
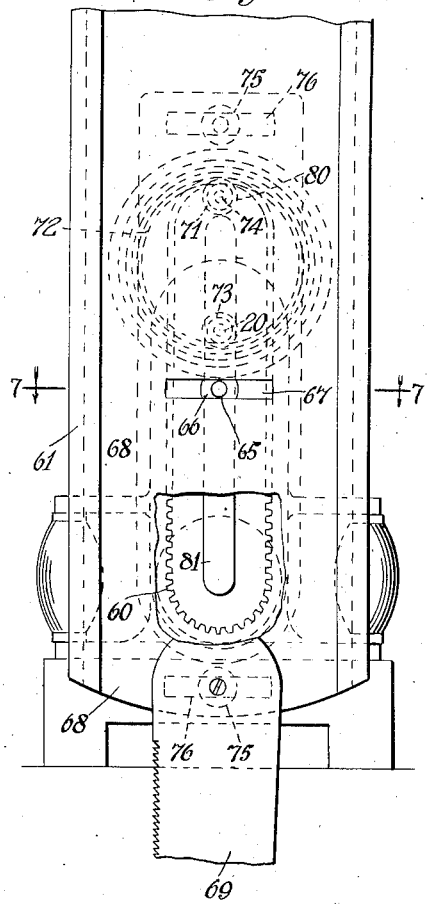
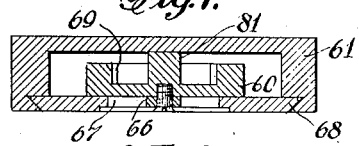
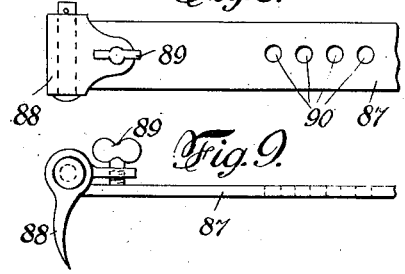
INVENTOR
Edward J. Maloney
BY
ATTORNEY Patented Mar. 8, 1927.

1,620,374

UNITED STATES PATENT OFFICE.

EDWARD J. MALONEY, OF LONG ISLAND CITY, NEW YORK.

MOTORIZED HANDSAW.

Application filed March 28, 1925. Serial No. 18,964.

The invention relates to motorized hand saws which are readily portable and which may be clamped, if necessary, to the material to be sawed thereby. It has for its object a saw of this type capable of doing the same work as the present rip, cross-cut or keyhole saw; and, also, to provide a construction which will admit of imparting to the saw frame for a reciprocatory saw blade a swinging movement, thereby enabling the cutting of beams, logs, etc., without necessitating the moving of the machine as a whole, as well as to provide a means for cutting to the end of a plank or board without any portion of the apparatus overhanging the end of such plank or board. A further object of the invention resides in means whereby circular cuts may be effected. A still further object is to afford in conjunction with the aforesaid apparatus novel means for securing the same to the work and at various angles.

The nature of the invention, however, will best be understood when described in connection with the accompanying drawings, in which—

Fig. 1 is a side elevation, and Fig. 2 a front elevation illustrating the improved apparatus.

Fig. 1ª is a perspective view of a clamping member for use with the novel apparatus.

Fig. 3 is a side elevation, with a portion of the mechanism in section, illustrating a modification of the means for effecting reciprocation of the saw and for swinging the same; and Fig. 4 is a plan thereof.

Fig. 5 is a side elevation illustrating a further modification, more especially in the means for effecting reciprocation of the saw; and Fig. 6 is a front elevation of the saw with a portion broken away to disclose the reciprocating rack employed.

Fig. 7 is a transverse horizontal section taken on the line 7—7, Fig. 6, and looking in the direction of the arrows.

Figs. 8 and 9 are respectively a plan and a side elevation of clamping means suitable for use with the improved sawing apparatus.

Referring to the drawings, more particularly to Figs. 1 and 2, 10 designates a suitable frame for a self-contained and suitably encased driving motor 11, for example an electric motor, and which may be provided with means 12 for electrical connection to an outside source of power. The circuit to the motor may be controlled thru a push button or like switching member 13 conveniently mounted in a handle member 14 which is secured to the top of the frame and is adapted to guide the apparatus when utilizing same to cut a member as, for example, the plank 15 on which said frame may rest thru suitable feet 16 and 17 of the said frame. Further handles 18 and 19 are also provided at either side of the frame to conveniently move same in a horizontal plane; and the saw apparatus may be thus used either right or left handed, it being understood that the saw is to be correspondingly positioned.

The shaft 20 of said motor carries at one end a disk member 21, and the latter in turn has eccentrically disposed thereon a wrist pin 22 about which is mounted to oscillate a block 23. The latter is designed to reciprocate in a slot 24 disposed at right angles to the shaft 20 in a sliding frame member 25, which frame member is mounted to reciprocate in a vertical plane in an auxiliary or guide frame 26. This guide frame 26, furthermore, is so mounted with respect to the motor carrying frame 10 as to be capable of oscillation about the axis of the shaft 20; and to this end is provided with a bearing member 27 directed inwardly toward the frame 10, fitted coaxially with the motor shaft over a boss or hub 28 thru which said shaft passes, and retained to said boss by a retaining clamp 29.

As previously set forth, the saw carrying frame 25 is mounted to be reciprocated in a vertical plane as in suitable ways of the frame 26; and at its lower end, the sliding frame 25 is recessed to accommodate the inner or butt end of a saw blade 30, the same being constructed with a reversible locking form and in manner to prevent relative axial movement thereof and may be further secured against removal outwardly therefrom as by a suitable holding screw 31. With the frame 10 thus positioned upon a member 15 to be cut and the saw blade 30 reciprocated by the motor 11, it will be appreciated that it would not be possible to cut to the end of a plank or beam without moving said frame to an extent such that a portion thereof would overhang the end of the work. The frame 26 carrying the saw slide or reciprocating carrying member 25 is therefore arranged to swing relatively to the motor frame 10, for example, about the axis of the hub 20 or the axis of the driving shaft 20 of motor 11, so that the saw 30 may be given an angular position rather than one perpendicular to the work. For this purpose, the hub 28 is provided with peripheral notches 32 designed to receive a plunger or latch member 33 adapted to be adjusted relatively to frame 26 thru the action of a lever 34 at the upper end which is conveniently associated with a further handle 35 at the top of the frame 26. In thus pressing, for example, inwardly upon the upper end of the lever 34, the frame 26 is released relatively to the motor frame 10, or rather hub 28 extending therefrom; and the entire saw frame 26, as a unit, together with reciprocating saw blade 30, may be oscillated the desired degree to locate said saw blade angularly with respect to the work. This will enable the said blade to cut some distance beyond the end of the work without necessitating shifting of the frame 10 to a position where its one end would overhang the end of the work. Moreover, with the frame 10 in fixed position relatively to the work, by grasping handle 35 and suitably swinging the saw thereby, it is possible to effect a cross cut of narrow boards such as flooring, etc., of a width up to the limit of space provided between the two legs 16 and 17 of the frame 10, the reciprocating saw blade being swung across the face of the apparatus and cutting off the length of the piece of work projecting thru. To secure the frame 26 with its saw blade slide 25 in any desired angular position, it is necessary merely to release the lever 34 which locks thereby the inner end of latch 33 in a corresponding notch 32, a spring 36 bearing against the said lever 35 being provided to insure against unintentional disengagement. Additional stop pins 29' may be provided to extend outwardly from the bearing 27 upon either side of the retaining clamp 29 to limit the extent of oscillating movement of the frame 26.

The arrangement hereinbefore described is also adapted to the making of circular cuts with suitable saw substituted, as a keyhole saw (not shown); and to this end, the underside of the motor frame 10 may be provided with a slot 40 in which is arranged to slide a bar 41 designed to carry at one end a suitable center point member 42, the bar being secured in adjusted position relatively to frame 10 as by means of a thumb nut or clamp member 43. The member 42 is to be pressed into the work 15 when it is desired to effect a circular cut and provide thereby a pivotal point about which the entire frame may be rotated in a horizontal plane during reciprocation of the saw in a vertical plane. This will effect the making of a circular cut about said point as an axis.

If it be desired to cut in an arc whose radius is greater than, for example, the distance between the feet 16 and 17, it will be understood that the slide bar 40 is to be reversed so that the center point member 42 will be on the outer side of the frame rather than within the frame.

Moreover, the supports or legs 16 and 17 of the frame are positioned such that their front faces will be parallel to the saw blade and may thus be utilized as guiding means for the work when cutting. Additional guiding means may be provided, as in removing the bar 41 and its member 42 from the slot, and substituting therefor a forked guide 44, Fig. 1ª, whose tines 45 are adapted to fit about an outer edge of the work to be cut.

In Figs. 3 to 6, there is indicated a somewhat different manner of effecting the swinging of the oscillatable frame and also the manner of effecting reciprocation of its saw carrying slide. For example, there is arranged to project into the reciprocating frame slot 24 a wrist pin 50 about which is mounted a block 51 to oscillate thereon as in the previously described embodiment, but said wrist pin 50 is carried by an internal gear member 52 which is mounted to rotate in a ball bearing race 53 of the carrying oscillatable frame 54, said gear member being driven by a pinion 55 on the motor shaft 20.

Similarly to the arrangement of the said previously described embodiment, the frame 54 is mounted to oscillate about the hub 28 of the stationary motor frame 10; but the oscillation or swinging movement is effected by means of a worm 56 and worm gear 57, the former being carried by and mounted to rotate in the frame 10 and the latter being carried by the frame 54. By turning the work shaft 58 in one direction or the other, the frame 54 with its reciprocating saw blade frame 26 will be swung correspondingly on the hub 28 about the shaft 20 as an axis; and the worm shaft 58 is provided with squared ends 59 extending beyond the frame to receive a suitable crank member or the like (not shown) for conveniently turning the worm and thereby oscillating the said saw carrying frame to make it possible to advance readily the saw across the face of the machine in cutting off heavy material. It will be appreciated, furthermore, that the worm gearing hereinbefore described will serve to hold the frame 54 to the motor frame 10 in addition to the retaining clamps 29.

The embodiments previously described are more particularly suited for work of lighter character, for example, in connection with the cutting of light materials as wall board and veneers and for shaping show cards and stage scenery. However, for heavier work it is desirable to provide a reciprocatory carrier for the saw blade which will insure a uniform pressure thereon thruout the reciprocation and a constant speed thru the full length of the stroke, that is to say, both while the saw is being drawn back and moved outwardly thru the action of the driving motor.

For this purpose, a continuous and elliptical internal rack member 60, Figs. 5 to 7, is provided and is mounted to reciprocate in a frame 61 which in this embodiment is arranged to be oscillated by a worm wheel and worm gear 62 and 63 respectively, similarly to the arrangement disclosed in Figs. 3 and 4. The rack member 60 has projecting outwardly therefrom a wrist pin 65 with block 66 mounted about same to oscillate thereon and fitting within a transverse slot 67 of the sliding plate 68 for the saw blade 69. The rack is mounted to slide in the frame 61 and is reciprocated therein thru the action of an idle pinion 71 meshing with the teeth of said rack, a portion of which pinion also meshes with an internal gear 72 driven from a pinion 73 on the motor shaft 20, similarly to the arrangement set forth in connection with the embodiment shown in Figs. 3 and 4. Pinion 71 is carried on frame 61 and is an idle pinion running on a stud 74 extending inwardly from the back of the said frame. Due to the rotation thus imparted to the pinion 71, the rack 60 will be caused to move upwardly or downwardly, as the case may be, thru engagement of its teeth with the teeth of the said pinion and until the bottom or top of the rack arrives at the said pinion. The rack will then be caused to have a lateral movement relatively to the said pinion, allowance therefor being made thru the sliding of block 66 in the slot 67 until the pinion engages the other side of the rack and reverses thereby the movement of said rack, a smooth reversal being thus effected. Guiding studs 75 in end slots 76 serve further to retain the rack and saw frames to each other, while permitting the ready change over of the direction of motion thru oscillation about block 66. In this manner, the carrier 68 for the saw blade 69 will have imparted thereto a constant and uniform speed over the full length of stroke for which it is designed. In order to insure for constant contact, the pinion 71 is provided with an intermediate roller bearing collar 80 which bears upon the inwardly projecting ridge 81 of the rack member, being thus always in engagement therewith irrespective of the particular position of the rack relatively to its driving pinion, and the said surface of the ridge riding over the collar 80 of the pinion 71.

The frame member 10 for carrying the apparatus as a whole may be provided along the bottom with a plurality of transversely disposed T-slots 86 in which may be adjusted bars 87 carrying at their outer ends clamping dogs 88 pivotally secured to the ends of said bars 87 and locked in position over the ends of the work, as by means of thumb nuts 89. Perforations 90, also, may be provided in the bars 87 to receive locking pins (not shown) adapted to pass thru suitable openings 91 of the bottom of the frame 10 and adapted to register with the holes 90. By the provision of these clamps, means are afforded, also, for cutting the work at an angle, it being understood that the respective bars 87 will be adjusted accordingly.

I claim :—

A portable motorized hand saw, comprising a carrying frame with handle for transporting the saw and for steadying the same when in use, a driving motor supported thereby and having a hub projecting axially therefrom, a saw supporting frame mounted on the carrying frame and slide for a saw carried thereby, said frame having a hub fitting over and rotatable on the said motor hub, a worm wheel on the saw frame hub and a worm on the motor hub and meshing with said worm wheel to lock the two hubs to each other and to afford means for effecting an angular adjustment of the saw carrying frame, an internal gear rotatably mounted within the saw supporting frame, the shaft of the driving motor extending within said saw supporting frame, and a pinion thereon meshing with the internal gear, and a wrist pin and block thereon carried by the internal gear and engaging the saw slide to reciprocate the saw.

In testimony whereof I affix my signature.

EDWARD J. MALONEY.